(12) United States Patent
Bonzi et al.

(10) Patent No.: US 10,891,661 B2
(45) Date of Patent: Jan. 12, 2021

(54) AUTOMATIC GENERATION OF ELECTRONIC ADVERTISING MESSAGES

(71) Applicant: 2KDirect, LLC, San Luis Obispo, CA (US)

(72) Inventors: Joe Bonzi, San Luis Obispo, CA (US); Shane Thomas, San Luis Obispo, CA (US); Jason Brown, San Luis Obispo, CA (US)

(73) Assignee: 2KDirect, LLC, San Luis Obispo, CA (US)

( * ) Notice: Subject to any disclaimer, the term of this patent is extended or adjusted under 35 U.S.C. 154(b) by 0 days.

(21) Appl. No.: 14/941,173

(22) Filed: Nov. 13, 2015

(65) Prior Publication Data

US 2016/0307238 A1 Oct. 20, 2016

Related U.S. Application Data

(63) Continuation of application No. 14/673,035, filed on Mar. 30, 2015, now abandoned, which is a continuation of application No. 12/018,056, filed on Jan. 22, 2008, now abandoned.

(51) Int. Cl.
*G06Q 30/00* (2012.01)
*G06Q 30/02* (2012.01)
*H04L 29/08* (2006.01)

(52) U.S. Cl.
CPC ......... *G06Q 30/0276* (2013.01); *G06Q 30/02* (2013.01); *G06Q 30/0269* (2013.01); *G06Q 30/0277* (2013.01); *H04L 67/02* (2013.01)

(58) Field of Classification Search
None
See application file for complete search history.

(56) References Cited

U.S. PATENT DOCUMENTS

| | | |
|---|---|---|
| 6,393,407 B1 | 5/2002 | Middleton, III et al. |
| 6,963,863 B1 | 11/2005 | Bannon |
| 7,428,497 B2 | 9/2008 | Agarwal et al. |
| 7,707,127 B2 | 4/2010 | Jhala et al. |
| 7,870,497 B2 | 1/2011 | Greer et al. |
| 8,356,253 B2 | 1/2013 | Greer et al. |
| 8,930,832 B2 | 1/2015 | Greer et al. |
| 9,361,632 B2 | 6/2016 | Greer et al. |
| 9,805,393 B2 | 10/2017 | Greer et al. |
| 10,068,253 B2 | 9/2018 | Greer et al. |
| 2002/0103698 A1 | 8/2002 | Cantrell |
| 2004/0186775 A1 | 9/2004 | Margiloff et al. |
| 2004/0205514 A1 | 10/2004 | Sommerer et al. |
| 2005/0235030 A1 | 10/2005 | Lauckhart et al. |

(Continued)

FOREIGN PATENT DOCUMENTS

WO 2007027453 3/2007

OTHER PUBLICATIONS

IPromote—How It Works, http://ipromote.com/works.asp, 1 pg., Internet accessed Jan. 22, 2008.

(Continued)

*Primary Examiner* — Alvin L Brown
(74) *Attorney, Agent, or Firm* — Perkins Coie LLP

(57) ABSTRACT

A facility for generating an advertising message is described. The facility extracts visual content from a model web page. The facility then constructs an advertising message that contains the extracted visual content.

26 Claims, 9 Drawing Sheets

(56) References Cited

U.S. PATENT DOCUMENTS

| | | |
|---|---|---|
| 2006/0122884 A1 | 6/2006 | Graham et al. |
| 2006/0212350 A1* | 9/2006 | Ellis ................. G06Q 30/0242 705/14.41 |
| 2007/0050253 A1 | 3/2007 | Biggs et al. |
| 2007/0083810 A1 | 4/2007 | Scott et al. |
| 2007/0156524 A1 | 7/2007 | Grouf et al. |
| 2007/0239530 A1* | 10/2007 | Datar ................... G06Q 30/02 705/14.41 |
| 2007/0260515 A1 | 11/2007 | Schoen et al. |
| 2007/0260516 A1 | 11/2007 | Schoen et al. |
| 2007/0271370 A1 | 11/2007 | Kehl |
| 2008/0140476 A1 | 6/2008 | Anand et al. |
| 2008/0195957 A1 | 8/2008 | Kim et al. |
| 2008/0228720 A1 | 9/2008 | Mukherjee et al. |
| 2008/0243826 A1 | 10/2008 | Bartz et al. |
| 2008/0306809 A1 | 12/2008 | Kwak et al. |
| 2009/0138351 A1 | 5/2009 | Shih et al. |
| 2009/0187477 A1* | 7/2009 | Bardin ................. G06Q 30/0273 705/14.69 |
| 2009/0265163 A1 | 10/2009 | Li et al. |
| 2009/0271260 A1 | 10/2009 | Sharma et al. |
| 2013/0291012 A1* | 10/2013 | Lerman .................. G06Q 30/02 725/32 |
| 2014/0278913 A1* | 9/2014 | Martel ................... G06O 30/02 705/14.41 |
| 2016/0307238 A1 | 10/2016 | Bonzi et al. |
| 2018/0218401 A1 | 8/2018 | Greer et al. |
| 2018/0341983 A1* | 11/2018 | Dean ..................... G06Q 30/02 |
| 2018/0365707 A1* | 12/2018 | Jha ..................... G06O 30/0245 |
| 2018/0374122 A1 | 12/2018 | Greer et al. |

OTHER PUBLICATIONS

International Search Report and Written Opinion; International Patent Application No. PCT/US09/31614; Filed: Jan. 21, 2009; Applicant: 2KDirect, LLC; dated Mar. 3, 2009.

"SNAP Preview Anywhere Adoption Skyrockets As Web Publishers and Bloggers Embrace Ability to Include Previews on Sites", SNAP for Immediate Release. Pasadena, California, Dec. 18, 2006, 2 pages.

"snap.com Announces Snap Shots", blog.snap.com. San Francisco, California, Apr. 16, 2007. Available at <http://blog.snap.com/2007/04/16/snapcom-announces-snap-shots>, 5 pages. [Last Accessed: Oct. 19, 2008].

* cited by examiner

| listing ID | target site | product category | version |
|---|---|---|---|
| 1 | cars.com | 11 | 1 |
| ... | ... | ... | ... | listing table — 600
— 611
— 601  — 602  — 603  — 604

*FIG. 6*

| listing ID | property name | count | container element | container class | container attribute | search expression | ignore case |
|---|---|---|---|---|---|---|---|
| 1 | member_name_val | 1 | span | member_name | | | |
| 1 | title | 1 | title | | | | |
| 1 | location | 1 | span | location | | | |
| 1 | price | 1 | span | price | | | |
| 1 | photo | 3 | img | | src | http://images.cars.com/thumbnail/DMI/[^"]+.jpg | |
| 1 | header_color | 1 | header_color | | val | \n(.*)\n | yes |
| 1 | background_color | 1 | background_color | | val | | yes |
| 1 | title_font_color | 1 | title_font_color | | val | | |
| 1 | body_font_color | 1 | body_font_color | | val | | |
| ... | ... | ... | ... | ... | ... | ... | ... | parsing instructions table — 700

FIG. 7

AUTOMATIC GENERATION OF ELECTRONIC ADVERTISING MESSAGES

CROSS-REFERENCE TO RELATED APPLICATIONS(S)

This application is a continuation of U.S. patent application Ser. No. 14/673,035, entitled "AUTOMATIC GENERATION OF ELECTRONIC ADVERTISING MESSAGES" and filed on Mar. 30, 2015, which is a continuation of U.S. patent application Ser. No. 12/018,056, entitled "AUTOMATIC GENERATION OF ELECTRONIC ADVERTISING MESSAGES" and filed on Jan. 22, 2008, the disclosures of which are incorporated herein by reference in their entireties.

TECHNICAL FIELD

The described technology is directed to the field of automatic generation of electronic advertising messages, and more particularly, to the field of online advertising.

BACKGROUND

The world wide web ("the web") permits companies and individuals to electronically publish content in the form of web pages that can be retrieved and displayed using a browser program running on a client computer system. Such "publishers" often sell to advertisers opportunities to present advertising messages together with their published content.

For example, an advertiser who is a music publisher may purchase opportunities to present an advertising message promoting a new music CD published by the publisher. The advertising message may be "rich" in a variety of ways. They may, for example, include text identifying the title of the CD and the responsible artist in a style that is visually compatible with an appealing background pattern and/or color, a series of multiple photos of the artist, a link to a web page on which the user can listen to the artist's music and purchase the CD, etc.

BRIEF DESCRIPTION OF THE DRAWINGS

FIG. 6 is a table diagram showing sample contents of a listing table used by some embodiments of the facility to map from groups of model web pages to a listing ID specifying a set of parsing instructions to use to parse model web pages of the group.

FIG. 7 is a table diagram showing sample contents of a parsing instructions table used by the facility in some embodiments to specify a set of parsing instructions to use to parse a model web page

DETAILED DESCRIPTION

The inventors have recognized that the kind of rich advertising messages described above often require specialized expertise and significant effort to generate. The inventors have further recognized that these substantial requirements for effectively generating rich advertising messages tend to limit the availability of such rich advertising messages to a relatively small number of sophisticated, well-funded advertisers who are in a position to satisfy those requirements. The inventors have further recognized that, if less expertise and effort was required to effectively generate rich advertising message, rich advertising messages would become available to a much wider population of advertisers.

A software facility for automatically generating electronic advertising messages ("the facility") is described. The facility uses an existing web page—sometimes referred to as the "model web page"—as a basis for automatically generating an advertising message, such as a display advertising message. For example, the facility may use as the model web page the web page to which the advertising message will be linked, the advertiser's home page, or another page having both the content and the look and feel desired for the generated advertising message.

The facility extracts elements such as background and text colors, textual content, and rich media from the model web page and populated into the advertising message. In some embodiments, the extraction is fully automatic. In some embodiments, the facility guides the user through selecting in the page the elements to be extracted. In some embodiments, the facility presents a user interface that the user may use to modify the advertising message generated by the facility.

In some embodiments, in connection with generating the advertising message, the facility enables its user to arrange to have the generated advertising message presented by one or more publishers.

By automatically generating advertising messages in some or all of the ways described above, the facility enables a user without specialized expertise to quickly and straightforwardly generate an effective rich advertising message, making rich advertising messages available to a much wider population of advertisers.

Figure 1:
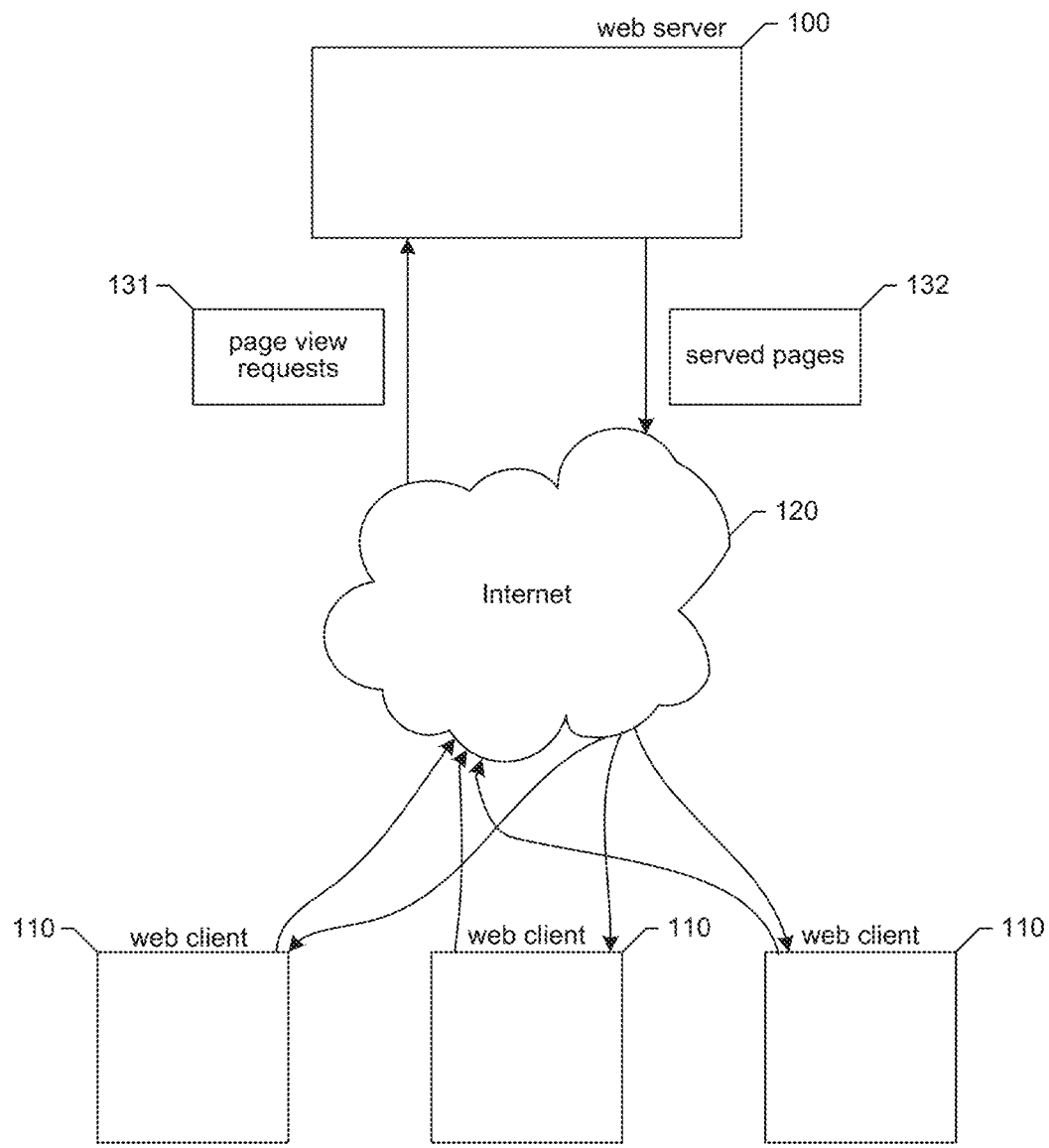
FIG. 1 is a high-level data flow diagram showing data flow within a typical arrangement of components used to provide the facility.

FIG. 1 is a high-level data flow diagram showing data flow within a typical arrangement of components used to provide the facility. A number of web client computer systems 110 that are under user control generate and send page view requests 231 to one or more logical web servers 100 via a network such as the Internet 120. Within the web server, these requests may either all be routed to a single web server computer system, or may be loaded-balanced among a number of web server computer systems. The web server typically replies to each with a served page 132. Web servers 100 may include web servers operated by publishers of web pages that present advertising messages, are linked to from advertising messages, or both. Web servers 100 may also include one or more web servers implementing aspects of the facility.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions and associated video sources, cameras, etc.

Figure 2:
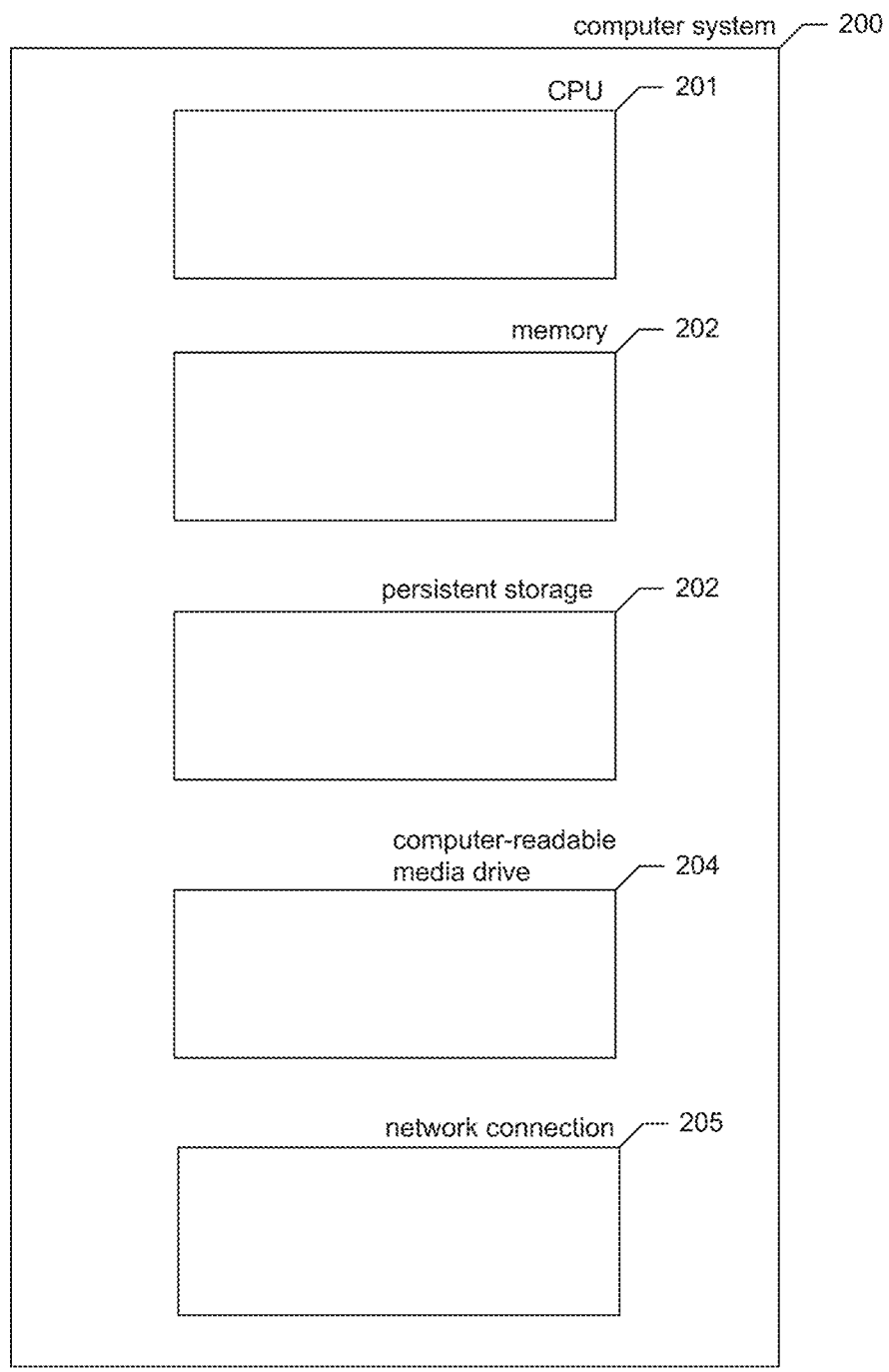
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
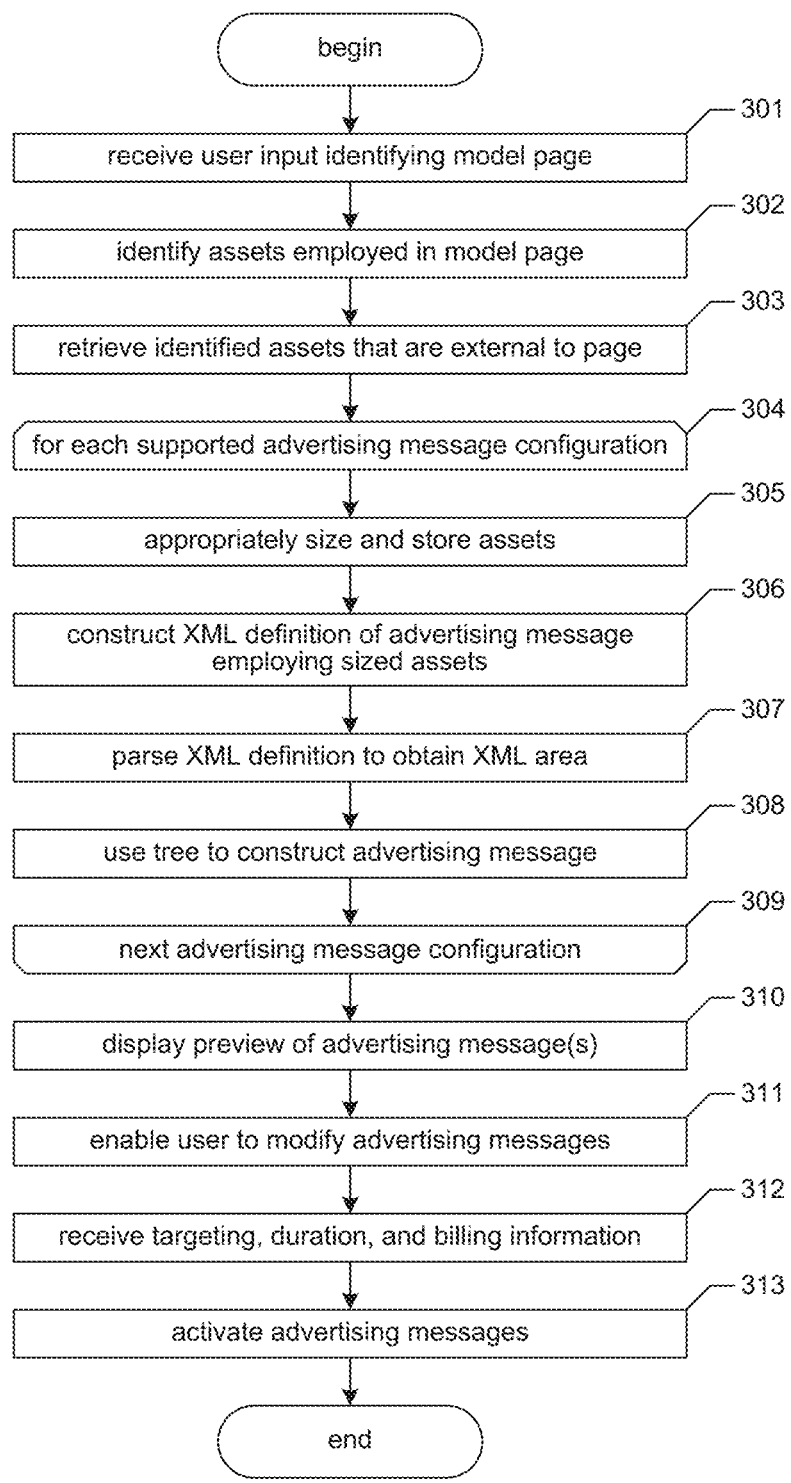
FIG. 3 is a flow diagram that shows steps typically performed by the facility in order to automatically generate one or more advertising messages.

FIG. 3 is a flow diagram that shows steps typically performed by the facility in order to automatically generate one or more advertising messages. In step 301, the facility receives user input identifying a model page upon which to base the generated advertising messages. The user input typically identifies the model page by specifying its URL, and can be received from the user in a variety of ways. In some embodiments, the facility serves a web page (not shown) to the user, and asks the user to type or paste the URL of the model page into a model page URL field. In some embodiments, the operator of the facility works with one or more publishers to cause an advertising message generation control to be incorporated in a number of different potential model pages.

Figure 4:
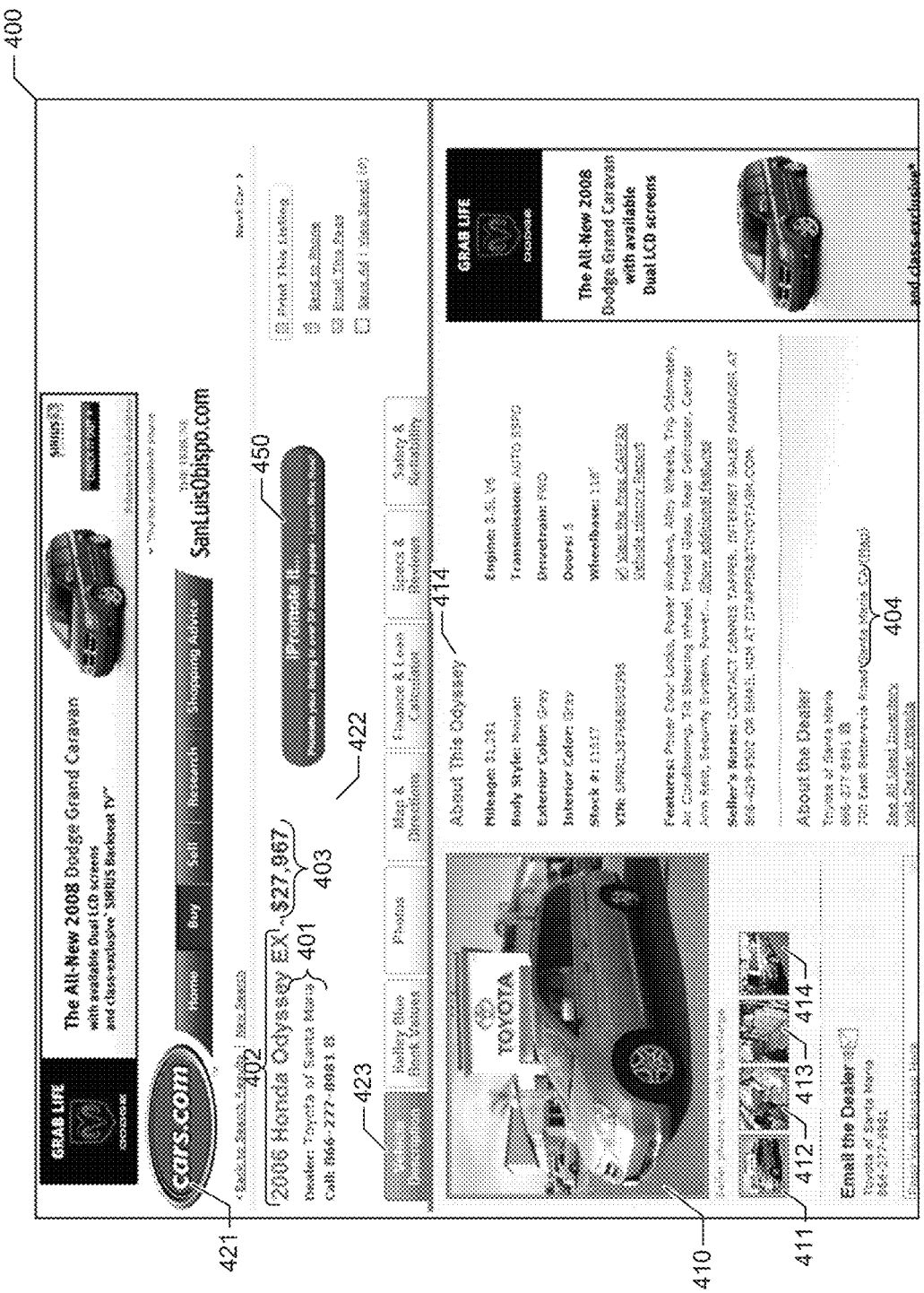
FIG. 4 is a display diagram showing a sample page containing a control that the user may activate in order to generate advertising messages based upon the sample page.

FIG. 4 is a display diagram showing a sample page containing a control that the user may activate in order to generate advertising messages based upon the sample page. The sample page 400 has a variety of contents, including the name 401 of an auto dealer selling a car; text 402 identifying the car; the listing price 403 for the car; and the city 404 in which the auto dealer is located. The model page also includes a number of thumbnail images 411-414, any of which the user can select to display at a larger size in space 410. The facility includes a number of colors, including the color of a logo 421, the color of the background 422, the color of the background of the selected tab 423, and the color of text such as text 414. In some embodiments, the extraction performed by the facility in step 301 extracts all of the above-discussed visual features. In a variety of embodiments, the facility extracts various other combinations of features contained by the page.

The page also contains control 450 that the user may activate in order to generate advertising messages for this page. In some embodiments, this control is included only in instances of the page served to a user who is the "owner" of the page, in this case a user associated with the auto dealer that is selling the car. In some embodiments, activation of this control causes the user's browser to send a request or other communication to a server on which aspects of the facility are executing. This communication contains the URL of the page, or some other basis for identifying the page such as a page ID.

Returning to FIG. 3, in step 302, the facility identifies assets employed in the model page, such as those described above in connection with FIG. 4. In some cases, this involves copying text, fonts, or colors that appear in the HTML code for the model page. In some cases, it involves copying references to external resources that are incorporated in the page, such as the URLs for each of the full-size versions of images 411-414, video or audio files, flash animations, etc. In some embodiments, the facility performs step 302 by retrieving a copy of the web page using its URL, and parsing the web page to extract tags, tag attributes, tag values, and other content expected to be relevant to the page.

Figure 5:
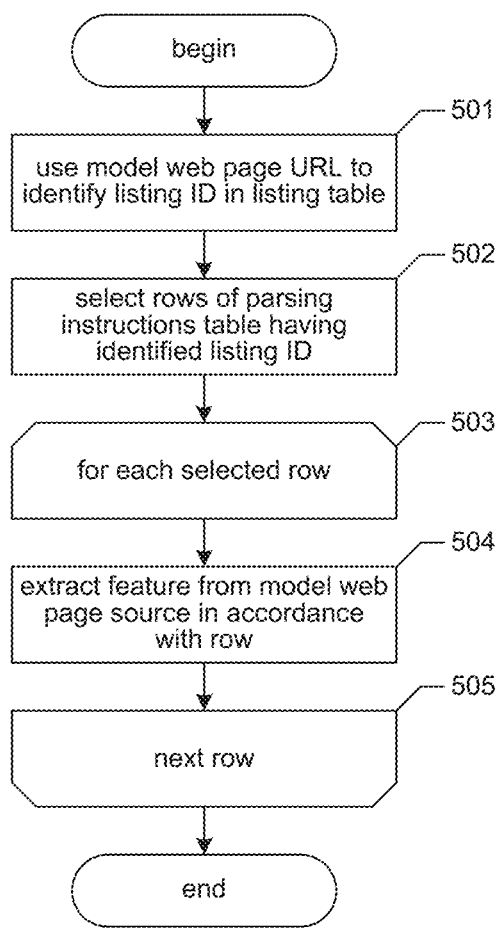
FIG. 5 is a flow diagram showing steps performed by the facility in some embodiments in order to identify assets employed in the model page.

FIG. 5 is a flow diagram showing steps performed by the facility in some embodiments in order to identify assets employed in the model page. In step 501, the facility uses the URL of the model web page to identify any listing table a listing ID to which the model web page corresponds.

FIG. 6 is a table diagram showing sample contents of a listing table used by some embodiments of the facility to map from groups of model web pages to a listing ID specifying a set of parsing instructions to use to parse model web pages of the group. The listing table 600 is made up of rows, such as row 611, each corresponding to one of the groups of model web pages. Each row is divided into the following columns: a listing ID column 601; a target site column 602 identifying the domain of web pages in this group; a product category identifying the category of item that is described by the Web pages in this group; and a version number that indicates a particular version of parsing instructions constructed for this group of web pages. With respect to the sample model web page, the facility uses the listing table to determine that listing ID one should be used, based upon the URL of the model web page being in the cars.com domain, the model web page corresponding to product category 11 for automobiles, and version number 1 being the largest version for that combination of target site and product category in the listing table.

Returning to FIG. 5, in step 502, the facility selects the rows of the parsing instructions table having a listing ID identified in step 501.

FIG. 7 is a table diagram showing sample contents of a parsing instructions table used by the facility in some embodiments to specify a set of parsing instructions to use to parse a model web page. The parsing instructions table 700 is made up of rows, such as rows 711-719, each corresponding to the parsing instruction for one property to be extracted from the model web page. Each row is divided into the following columns: a listing ID column 701 in which the facility matches the listing ID identified in step 501; a property name column 702 specifying a name attributed to the feature to be extracted from the model web page; a count column 703 indicating the maximum number of matching features to extract from the model web page for the property; a container element column 704 specifying a type of tag to be matched for the property; a container class column 705 specifying a particular class of the container element to be matched; a container attribute column 706 specifying a particular attribute of the matching tag whose value is to be copied; a search expression column 707 specifying a regular expression to be matched by the copied text; and it and ignore case column 708 specifying whether the search expression in column 707 is to be treated as case insensitive. Typically, the rows of the parsing instructions table corresponding to a particular listing are generated by a human agent based upon a review of the HTML source for a sample of pages published by a publisher.

In steps 503-505, the facility loops through each row of the parsing instructions table selected in step 502. In step 504, the facility extracts one or more features from the HTML source for the model web page in accordance with the parsing instructions contained in the row. In step 505, if additional selected rows of the parsing instructions table remain to be processed, then the facility continues in step 503 to process the next selected row, else these steps conclude. In some embodiments (not shown), the facility similarly applies the parsing instructions to pages linked to from the model web page. In some embodiments, links are only followed for this purpose if they identify a URL in the same domain as the model web page. In some embodiments (not shown), the facility similarly applies the parsing instructions recursively in this manner, up to a predetermined maximum depth, such as three.

The application of the sample contents shown in the parsing instructions table 700 is discussed below in connection with the HTML source for the sample model web page shown below in Table 1.

TABLE 1

1. <!DOCTYPE html PUBLIC "-//W3C//DTD XHTML 1.0 Transitional//EN"
2. "http://www.w3.org/TR/xhtml1/DTD/xhtml1-transitional.dtd">
3. <html xmlns="http://www.w3.org/1999/xhtml">
4. <!-- Memberdata.zip='93401' -->
5. <!-- end: _MemberPhone.jsp
6. MemberPhone='866-277-8981'
7. isTollFree='true'
8. sessionScope.useTollFree='false'
9. -->
10. <head>
11.   <title> 2006 Honda Odyssey EX-L</title>
12.   <meta name="description" content=""/>
13.   <meta name="keywords" content=""/>
14.   <header_color val="0x562cab" />
15.   <background_color val="0xffffff"/>
16.   <title_font_color val="0xf5812c"/>
17.   <body_font_color val="0x888888"/>
18.   <img class="photo_1" name="tnImg0" id="tnImg0" src="http://images.cars.com/thumbnail/DMI/25289/11517.jpg" alt="" onerror="document.getElementById('tn0').style.display='none';"/>
19.   <img class="photo_2" name="tnImg1" id="tnImg1" src="http://images.cars.com/thumbnail/DMI/25289/11517.02.jpg" alt="" onerror="document.getElementById('tn1').style.display='none';"/>
20.   <img class="photo_3" name="tnImg2" id="tnImg2" src="http://images.cars.com/thumbnail/DMI/25289/11517.03.jpg" alt="" onerror="document.getElementById('tn2').style.display='none';"/>
21. <h1>
22. 2006 Honda Odyssey EX-L - <span class="Price">$27,967</span> <span id="mdFlag" class="nwListOn"></span>
23. </h1>
24. <span class="label">Member_Name</span> <span class="data">Toyota of Santa Maria</span>
25. function clearValue(field) {
26.   if(field.value.indexOf("Enter Your Message Here") != -1){
27.     field.value = '';
28.     field.style.color = '#333333';
29.   <div id="aboutSellerBox" class="Dealer">
30.     <h2>About the Dealer</h2>
31.     <div id="sellerAddress">
32.       <div class="dataPoint">
33. <span class="member_name">Toyota of Santa Maria</span>
34.       </div>
35.       <div class="dataPoint">
36.         <span class="phone">866-277-8981
37.         <img src="http://a137.g.akamai.net/n/137/3538/20060217221024/www.cars.com/search/images/phone_Icon.gif"/>

TABLE 1-continued

38.       </div>
39.       <div class="address">
40.         <span class="Location">
41.           700 East Betteravia Road
42.           Santa Maria
43.           CA
44.         </span>
45. </body>
46. </html>

To process row 711 of the parsing instructions table, the facility searches the HTML source for the first-occurring span tag having the class member name, which it finds in line 33. Because row 711 does not specify a particular attribute of the span tag whose value is to be copied, the facility copies the content of the tag, "Toyota of Santa Maria." To process row 712 of the parsing instructions table, the facility searches the HTML source for the first-occurring title tag, which it finds in line 11. The facility copies the content of the tag, "2006 Conduct Odyssey EX-L." To process 713, the facility searches for the first-occurring span tag having the class location, which it finds in line 40. In accordance with the search expression specified in row 713, the facility copies the text between the first and second new-line character in the content of the tag, i.e., "Santa Maria." To process row 714, the facility searches for the first-occurring span tag having the class price which it finds in line 22, and copies the content of the tag, "$27,967." To process row 715, the facility searches for the first-occurring three img tags whose src attribute has a value matching the search expression specified in row 715. These occurrences are in lines 18, 19, and 20, from each of which the facility copies the URL text. To process row 716, the facility searches for the first-occurring header_color tag which it finds in line 14, and copies the value of the val attribute, "0x562cab." To process row 717, the facility searches for the first-occurring background_color tag which it finds in line 15, and copies the value of the val attribute, "0xffffff." To process row 718, the facility searches for the first-occurring title_font_color tag which it finds in line 16, and copies the value of the val attribute, "0xf5812c." To process row 719, the facility searches for the first-occurring body_font_color tag which it finds in line 17, and copies the value of the val attribute, "0x888888."

In various embodiments, the facility uses a wide variety of regular expression schemes to specify the search expressions contained in column 707, including but not limited to those used by the Microsoft Visual Basic scripting language and the PHP hypertext processor. In some embodiments, the grammar used by the facility has one or more of the following characteristics:

Vertical Bar, |, is used to separate alternatives. For example, http://|https:// can match "http://" or "https://".

Parentheses are used to define the scope and precedence of operators. For example, gray|grey and gr(a|e)y are equivalent patterns which both describe the set of "gray" and "grey".

The ^ character, contained in brackets [ ] means "not". In these examples, [^"] means, "match all characters that are NOT a double quote".

A quantifier after a token (such as a character) or group specifies how often that preceding element is allowed to occur.

The question mark quantifier indicates there is zero or one of the preceding element. For example, colou?r matches both "color" and "colour".

The asterisk quantifier indicates there are zero or more of the preceding element. For example, ab*c matches "ac", "abc", "abbc", "abbbc", and so on.

The plus-sign quantifier indicates that one or more of the elements preceding it must exist. In these examples, [^"]+ means that there must exist one or more characters in this spot that is not the double-quote character.

Additional examples of search expression pattern matching follow. The examples assume that the HTML source for the model web page is that shown below in Table 2.

TABLE 2

1. <img src="http://www.images.com/images/user/small/4773237b783nxgh34.jpg">
2. <img src="http://www.images.com/images/user/small/4773237b783nxgh34.gif">
3. <img src="http://www.images.com/images/user/medium/94987348745.jpg">
4. <img src="https://www.images.com/images/user/medium/aksdfulSJSIVK.gif">
5. <img src="https://www.images.com/images/user/large/aksdfulSJSIVK.jpg">
6. <img src="https://www.images.com/images/user/large/Iskvisljghi83248498.gif A first example is a search expression that returns only .jpg images of any size:

(http://|https://)www.images.com/images/user/(small|medium|large)/[^"]+.jpg

This search expression returns the URLs in lines 1, 3, and 5. A second example is a search expression that returns only medium-sized .jpg images:

(http://|https://)www.images.com/images/user/medium/[^"]+.jpg

This search expression returns the URL in line 3. A third example is a search expression that returns only non-secure (http) .jpg and .gif images of any size:

(http://www.images.com/images/user/(small|medium|large)/[^"]+.(jpg|gif)

This search expression returns the URLs in lines 1, 2, and 3.

In some embodiments, the operator of the facility makes arrangements with one or more web publishers under which the web publishers make available a direct interface that may be called by the facility to directly retrieve information about the assets employed in any page published by the publisher. In such embodiments, step 302 involves sending a request to the publisher's interface that identifies the model page, such as by providing a URL or page ID for the page. The publisher responds with a response that contains the assets to be incorporated in the generated advertising message that makes it unnecessary to parse the HTML source for the model page in order to obtain this information.

In some embodiments, the publisher includes source for the advertising message generation control in the model web page that, when the control is activated, causes the browser to post to a server executing portions of the facility information identifying the assets to be incorporated in the generated advertising message. Here too, it is unnecessary for the facility to parse the HTML source for the model page in order to obtain this information.

In step 303, the facility retrieves assets identified in step 302 that are external to the page, such as images, video and audio streams, animations, etc.

In some embodiments, the facility generates multiple different advertising messages in response to each user request. These different advertising messages, referred to as "advertising message configurations," can correspond to various advertising message dimensions, media types, maximum or target data sizes and/or data rates, etc. For example, the Interactive Advertising Bureau provides specifications for different standard advertising message types, such as at www.iab.net/iab_products_and_industry_services/1421/1443/1473/81563 and www.iab.net/iab_products_and_industry_services/1421/1443/1452. Those skilled in the art will appreciate that various other advertising message configurations may be supported by the facility.

In step 304-309, the facility loops through each of the advertising message configurations it supports. In step 305, the facility appropriately sizes and stores copies of assets identified in step 302 in a manner appropriate for the dimensions and other attributes of the current advertising message configuration. For text assets, this may include cropping the text and/or changing or setting its size. For images, video streams, etc., this can involve cropping, zooming, panning, etc. In step 306, the facility constructs an XML definition of the advertising message employing the assets as sized in step 305. A sample XML definition is shown below in Table 3 that corresponds to the HTML source shown in Table 1.

TABLE 3

1. <?xml version="1.0" encoding="UTF-8" ?>
2. <listing version="1" xmlns="http://xspf.org/ns/0/">
3. <product>
4. <member_name val="Toyota of Santa Maria" />
5. <is_dark val="1" />
6. <is_background_dark val="1" />
7. <title val="2006 Honda Odyssey EX-L " />
8. <description val=" " />
9. <category val="11" />
10. <location val="Santa Maria " />
11. <price val="$27,967.00" />
12. <account_photo val="" />
13. <number_of_photos val="3" />
14. <photo_1 val="http://images.cars.com/main/DMI/25289/11517.jpg" />
15. <photo_2 val="http://images.cars.com/main/DMI/25289/11517.02.jpg" />
16. <photo_3 val="http://images.cars.com/main/DMI/25289/11517.03.jpg" />
17. <condition val="" />
18. <header_color val="0x562cab" />
19. <background_color val="0xffffff" />
20. <title_font_color val="0xf5812c" />
21. <body_font_color val="0x888888" />
22. <ipromote_url val="http://www.cars.com/go/search/detail.jsp;?tracktype=usedcc&searchType=21&pageNumber=0&numResultsPerPage=50&largeNumResults
23. PerPage=0&sortorder=descending&sortfield=PRICE+descending&certifiedOnly=false&criteria=K-%7CE-%7CM-_18_%7CD-_215_%7CN-N%7
24. CR-30%7Cl-1%7CP-PRICE+descending%7CQ-descending%7CZ-93401&aff=national&paId=250149140&recnum=0&leadExists=true" />
25. </product>
26. </listing>

The dealer name extracted from line 24 of Table 1 is included on line 4 of Table 3. The title text extracted from line 11 of Table 1 is included at line 7 of Table 3. The dealer location extracted from line 42 of Table 1 is included at line 10 of Table 3. The price extracted from line 22 of Table 1 is included at line 11 of Table 3. The image URLs extracted from lines 18-20 of Table 1 are included at lines 14-16 of Table 3. The color values extracted from lines 14-17 of Table 1 are included at lines 18-21 of Table 3. In step 307, the facility parses the XML definition constructed in step 306 to obtain an XML tree. In step 308, the facility uses the tree obtained in step 307 to construct the advertising message. In some embodiments, in step 306, the facility constructs a Macromedia Flash file having the ".swf" file name extension. The constructed Flash file contains a reference to the XML tree that causes an action receipt included in the Flash file to load the XML tree and use it as a basis for presenting the advertising message. In some embodiments, the facility includes in the generated advertising message a link that viewers of the advertising message can activate to display the model web page, or another web page specified by the user. In step 309, if additional advertising message configurations remain to be processed, then the facility continues in step 304 to process the next advertising message configuration, else the facility continues in step 310.

In step 310, the facility displays a preview of one or more of the generated advertising messages. In step 311, the facility enables the user to modify the generated advertising messages.

Figure 8:
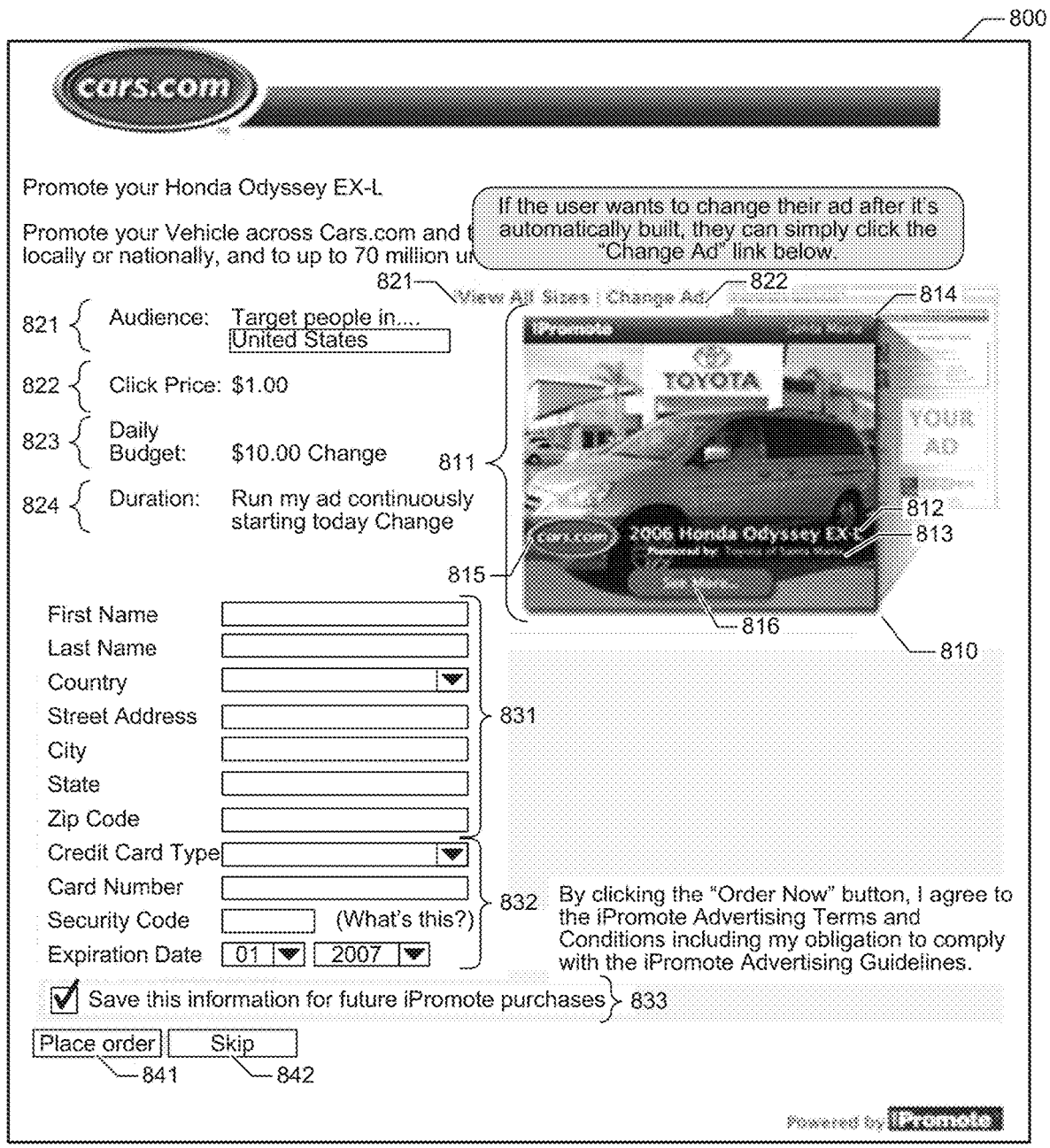
FIG. 8 is a display diagram showing a sample preview display presented by the facility.

FIG. 8 is a display diagram showing a sample preview display presented by the facility. The display 800 includes a preview of one of the advertising messages generated for the model page shown in FIG. 4. The advertising message preview 810 includes elements from the model page, including an image 811 cropped from image 410 and/or image 411 shown in the model page, text 812 identifying the car, text 813 identifying the auto dealer, text 814 identifying the location of the auto dealer, and logo 815 for the publisher web site. The advertising message preview further includes a control 816 for traversing a link to the model web page. The advertising message preview further incorporates colors and/or fonts from the model page.

The page further includes a control 821 that the user can activate in order to display the different advertising messages generated by the facility for the different advertising message configurations. The display also includes a control 822 that the user can activate in order to modify the generated advertising message or advertising messages.

Figure 9:
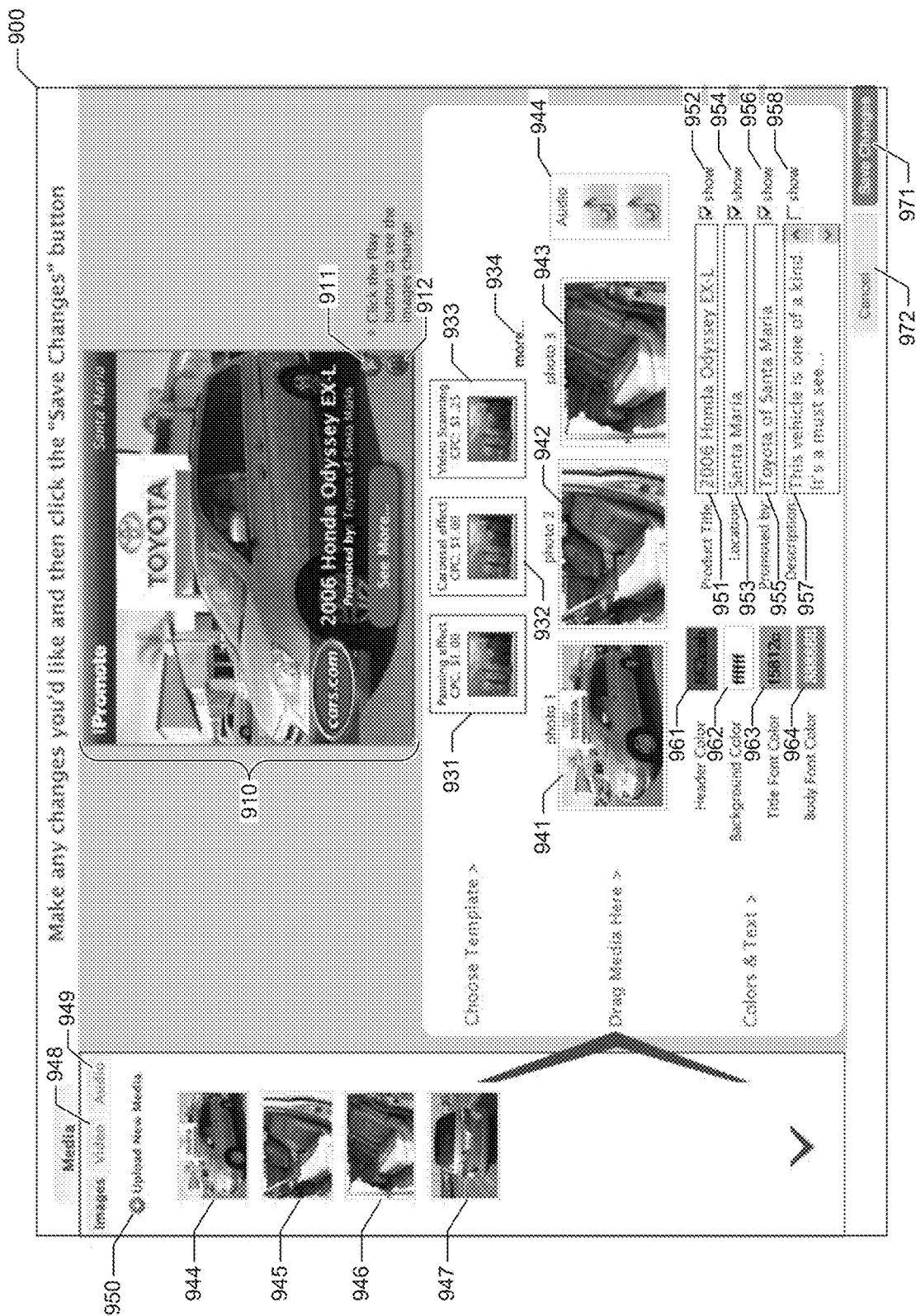
FIG. 9 is a display diagram showing a typical display presented by the facility to enable the user to modify advertising messages generated by the facility.

FIG. 9 is a display diagram showing a typical display presented by the facility when the user activates the change advertising message control shown in FIG. 8. The user interface presents a copy 910 of the generated advertising message. The advertising message is accompanied by play and pause controls 911 and 912, respectively, that the user can use to play and pause time-index materials associated with the advertising message, such as image slide shows, video/audio sequences, animations, etc. Panel 920 represents different types of modifications that the user may make to the advertising message. The user may select any of controls 931-934 to select different visual effects to be applied to the advertising message, including panning, image carousel, video scanning, etc. The user may also drag to spaces 941-943 any images that the user wishes to have incorporated in the advertising message. The user may drag to these spots any of the images 944-947 shown on the left side of the display. The user may also select tab 948 in order to display video clips that can be dragged to the spots for inclusion in the advertising message, or tab 949 to display audio clips that can be included in the advertising message by dragging them to an audio spot 944. Further, the user can activate control 950 in order to directly upload media of virtually any type for inclusion in the advertising message. The display further includes text fields 951, 953, 955, and 957 whose contents the user may edit for inclusion in the advertising message. Each text field is accompanied by a show check box 952, 954, 956, and 958 that the user may check or uncheck to determine whether the corresponding text will appear in the advertising message. The display further includes four colors 961-964 used in the advertising message. The user may select any of those in order to change it. In some embodiments, the user can type a new color value after selecting one of the colors. In some embodiments, when the user selects a color, the facility presents a color picker user interface that the user may navigate in order to select a new color value for the selected color (not shown). After the user has made desired modifications, the user selects a save changes control 971. If the user wishes to revert to the originally-generated advertising message, the user can select the cancel control 972 to return to the display shown in FIG. 8 without making any changes.

Returning to FIG. 3, in step 312, the facility receives information from the user about targeting the advertising message, specifying its duration, and providing billing information. In step 313, the facility activates the advertising messages in accordance with the information specified by the user. After step 313, these steps conclude.

Those skilled in the art will appreciate that the steps shown in FIG. 3 may be altered in a variety of ways. For example, the order of the steps may be rearranged; substeps may be performed in parallel; shown steps may be omitted, or other steps may be included; etc.

Returning to FIG. 8, the display 800 includes a control 821 usable by the user to specify a geographic region to which the advertising message is to be targeted. In various embodiments (not shown), the facility permits the user to specify a variety of other types of targeting, including behavioral targeting, profile-based targeting, and specific publisher or publisher group targeting. The display also contains an indication 822 of the cost to the advertiser each time a user clicks through the generated advertising message. The display further includes a control 823 that the user may use in order to specify a daily budget for the advertising message. Typically, when the daily budget is reached during a particular day, the advertising message is not presented again until the next day. The display also includes a control 824 that the user can use to specify a duration for presenting the advertising message. The display also includes controls for specifying billing information used to pay for presenting the advertising message, including address information 831, credit card information 832, and an indication 833 of whether the billing information should be saved as a basis for presenting future advertising messages. After the user is satisfied with the information that the user has specified in connection with the generated advertising message, the user selects control 841 in order to activate the advertising message. If the user has decided against activating the advertising message, the user can select a skip control 842.

In some embodiments, the facility provides a mechanism for the user to download the generated and/or modified advertising messages and associated resources. In some embodiments, the facility provides a mechanism for providing the generated and/or modified advertising messages directly from the facility to a third-party advertising agency or ad serving service provider.

It will be appreciated by those skilled in the art that the above-described facility may be straightforwardly adapted or extended in various ways. For example, the facility may generate advertising messages from model pages having a wide variety of file types and/or formats. The facility may extract a wide variety of kinds of content from the model page, and be used in conjunction with a variety of user interfaces for modifying and/or activating generated advertising messages. While the foregoing description makes reference to particular embodiments, the scope of the invention is defined solely by the claims that follow and the elements recited therein.

We claim:

1. A method in a computing system for generating an advertising message, comprising:
   receiving a URL corresponding to a web page;
   without any user input:
      using the received URL to retrieve HTML source code of the web page;
      matching patterns in the retrieved HTML source code of the web page to identify in the retrieved HTML source code of the web page information specifying visual features of the web page, wherein the identified information specifying visual features of the web page comprises:
         one or more HTML attributes, and
         corresponding values for the one or more HTML attributes; and
      constructing a plurality of advertising messages each incorporating at least a portion of the visual features of the web page specified by the identified information; and
      after the plurality of advertising messages have been constructed, providing at least one of the constructed advertising messages in response to an opportunity to present an advertising message on the web page and at least one page other than the web page;
   presenting at least one of the constructed advertising messages to a user, together with a user interface for modifying the at least one constructed advertising message;
   receiving user input manipulating the user interface, wherein receiving user input manipulating the user interface comprises receiving, from a user, an image, from a gallery of images each extracted from the web page, dragged by the user to a target drop region of the user interface; and
   modifying the at least one constructed advertising message in accordance with the received user input, wherein modifying the at least one constructed advertising message in accordance with the received user input comprises incorporating the image, from the gallery of images extracted from the web page, dragged by the user to the target drop region of the user interface, into the constructed advertising message.

2. The method of claim 1, further comprising:
   previewing at least one of the constructed advertising messages; and
   providing a user interface usable by a user to modify at least one of the constructed advertising messages.

3. The method of claim 1, further comprising launching an advertising campaign for presenting at least one of the constructed advertising messages on publisher web pages.

4. A method in a computing system for generating an advertising message, comprising:
   extracting visual content from a model web page;
   constructing an advertising message that contains the extracted visual content;
   receiving, from a user, an image, from a gallery of images each extracted from the model web page, dragged by the user to a target drop region of a user interface for modifying the constructed advertising message; and
   modifying the at least one constructed advertising message in accordance with the received user input, wherein modifying the at least one constructed advertising message in accordance with the received user input comprises incorporating the image, from the gallery of images each extracted from the model web page, dragged by the user to the target drop region of the user interface, into the constructed advertising message.

5. The method of claim 4, further comprising extracting audio content from the model web page,
   and wherein the constructed advertising message contains the extracted audio content.

6. The method of claim 4 wherein the extracted visual content comprises text in a first format so that the constructed advertising message contains text in the first format.

7. The method of claim 4 wherein the extracted visual content comprises text in a first color so that the constructed advertising message contains text in the first color.

8. The method of claim 4 wherein the extracted visual content comprises a first background color so that the constructed advertising message contains the first background color.

9. The method of claim 4 wherein the extracted visual content comprises an image.

10. The method of claim 4 wherein the extracted visual content comprises a video sequence.

11. The method of claim 4 wherein the extracted visual content comprises a plurality of images,
    and wherein the constructed advertising message contains an interface for navigating among the extracted plurality of images.

12. The method of claim 4 wherein the constructed advertising message contains a link to the model web page.

13. The method of claim 4, further comprising receiving user input user identifying the model web page,
    wherein the extracting and constructing are performed in response to receiving user input user identifying the model web page, without receiving any further user input.

14. The method of claim 4 wherein the extracting comprises:
    parsing HTML source for the model web page to identify tags each matching one of a set of sought tag types; and
    for each of the identified tags, adding an asset to the constructed advertising message that corresponds to the identified tag.

15. The method of claim 4 wherein the extracting comprises:
    parsing HTML source for the model web page to identify strings each matching one of a set of sought regular expressions; and
    for each of the identified string, adding an asset to the constructed advertising message that corresponds to the identified string.

16. The method of claim 4, further comprising extracting visual content from one or more pages linked to from the model web page, and wherein the constructed advertising message contains the visual content extracted from the pages linked to from the model web page.

17. The method of claim 4 wherein the extracting comprises:
    sending a visual content request to a publisher of the model web page; and
    receiving from the publisher a visual content response containing the extracted visual content.

18. The method of claim 4, further comprising receiving user input generated by a user's operation of a control on the model web page for constructing an advertising message that is based on the model web page, and wherein the extracting is performed in response to the user input generated by the user's operation of the control.

19. The method of claim 4, further comprising receiving input from a user selecting the visual content to be extracted from the model web page.

20. The method of claim 4, further comprising receiving user input specifying payment information to be used to pay for presentation of the constructed advertising message.

21. The method of claim 4, further comprising presenting the constructed advertising message among content published by a publisher.

22. A computing system for generating an advertising message, comprising:
a processor;
a memory;
an extraction subsystem that extracts content from a model web page;
an advertising message construction subsystem that constructs an advertising message containing the extracted content,
wherein each subsystem comprises computer-readable instructions stored in the memory for execution by the processor; and
an advertising message modifying subsystem that,
receives from a user, an image, from a gallery of images each extracted from the model web page, dragged by the user to a target drop region of a user interface, and
modifies the constructed advertising message by incorporating the image, from the gallery of images extracted from the model web page, into the constructed advertising message.

23. A computer-readable hardware device whose contents cause a computing system to perform a method for generating an advertising message, the method comprising:
extracting visual content from a model web page;
constructing an advertising message that includes the extracted visual content;
receiving user input manipulating a user interface, wherein receiving user input manipulating the user interface comprises receiving, from a user, an image, from a gallery of images each extracted from the model web page, dragged by the user to a target drop region of the user interface; and
modifying the at least one constructed advertising message in accordance with the received user input, wherein modifying the at least one constructed advertising message in accordance with the received user input comprises incorporating the image, from the gallery of images extracted from the model web page, into the constructed advertising message.

24. The method of claim 1, wherein constructing at least one advertising message of the plurality of advertising messages comprises:
constructing an XML definition of the at least one advertising message employing one or more of the identified visual features of the web page.

25. The method of claim 4,
wherein the at least one constructed advertising message contains a play control for playing time-index materials associated with the at least one constructed advertising message,
wherein the at least one constructed advertising message contains a pause control for pausing time-index materials associated with the at least one constructed advertising message,
wherein the time-index materials associated with the at least one constructed advertising message comprise an image slide show.

26. The method of claim 1,
wherein the at least one constructed advertising message contains a play control for playing time-index materials associated with the at least one constructed advertising message,
wherein the at least one constructed advertising message contains a pause control for pausing time-index materials associated with the at least one constructed advertising message,
wherein the time-index materials associated with the at least one constructed advertising message comprise an audio sequence.

* * * * *